United States Patent [19]

Kono

[11] Patent Number: 5,274,622
[45] Date of Patent: Dec. 28, 1993

[54] APPARATUS FOR CONTROLLING EMISSION POWER OF LASER DIODE

[75] Inventor: Mutsumi Kono, Tokorozawa, Japan

[73] Assignee: Pioneer Electronic Corporation, Tokyo, Japan

[21] Appl. No.: 977,292

[22] Filed: Nov. 16, 1992

[30] Foreign Application Priority Data

Nov. 19, 1991 [JP] Japan .................. 3-303103

[51] Int. Cl.$^5$ ........................................... G11B 7/085
[52] U.S. Cl. ..................... 369/116; 369/120
[58] Field of Search ............... 369/116, 120, 99, 126, 369/47, 53; 360/114

[56] References Cited

U.S. PATENT DOCUMENTS

5,182,742  1/1993  Ohmori et al. .............. 369/116
5,193,083  3/1993  Yanagawa ................... 369/116

Primary Examiner—Paul M. Dzierzynski
Assistant Examiner—Don Wong
Attorney, Agent, or Firm—Sughrue, Mion, Zinn, Macpeak & Seas

[57] ABSTRACT

An apparatus for controlling an emission power of a laser diode is used in an apparatus for recording and reproducing information of an optical disk, which has a power calibration area and to which a disk discrimination code is recorded. The controlling apparatus is provided with: a power detection device for detecting an optimum recording power of the laser diode with respect to the optical disk to be recorded by use of the information reproduced from the power calibration area; a temperature detection device for detecting a temperature of the laser diode; a memory device for storing the optimum recording power detected by the power detection device, the temperature detected by the temperature detection device and the reproduced disk discrimination code; and a control device, to which the disk discrimination code reproduced at the present time is inputted, for comparing the temperature at the present time detected by the temperature detection device and the temperature stored in the memory device corresponding to the inputted disk discrimination code, and instructing the power detection device to detect the optimum recording power if the difference between the compared temperatures exceeds a predetermined value before a recording operation of the recording and reproducing apparatus.

7 Claims, 6 Drawing Sheets

| DISK DISCRIMINATION CODE | OPTIMUM RECORDING POWER VALVE | TEMPERATURE |
|---|---|---|
| 1 2 3 4 5 6 | $x$ (mW) | 50 (°C) |
| 3 3 2 4 1 1 | $y$ (mW) | 30 (°C) |
| 6 6 3 2 4 5 | $z$ (mW) | 35 (°C) |
| ⋮ | ⋮ | ⋮ |

APPARATUS FOR CONTROLLING EMISSION POWER OF LASER DIODE

BACKGROUND OF THE INVENTION

1. Field of the Invention

This invention relates to an apparatus for controlling an emission power of a laser diode, and more particularly to an emission power controlling apparatus which is adapted to carry out power calibration of an optimum recording power of a laser diode used for recording information onto a recordable optical disk such as a R-CD (Recordable Compact Disk), etc.

2. Description of the Related Art

Aside from a CD (Compact Disk) which is conventionally known, there is a R-CD as an optical disk which is recordable on the user side.

In the case of recording information onto such a R-CD by means of a R-CD player, which is adapted to record signals onto the R-CD and reproduce those signals therefrom, a laser diode for recording is used. Whether the recording quality is good or bad in such a R-CD player, depends upon various factors such as physical characteristic and optical characteristic of the R-CD, a wavelength of a laser diode used, and so on. Thus, it becomes very important to calibrate a recording laser power i.e. an emission power of the laser diode, so that its power value is in correspondence with an optimum value.

A calibration method of determining an optimum recording laser power value is carried out by first recording test signals onto a track exclusively used for calibration provided on the R-CD, with the value of a recording laser power changed stepwise every predetermined time on the basis of an ATIP (Absolute Time In Pregroove) Sync (Synchronizing signal), and thereafter by reading and reproducing the recorded test signals. Then, a d.c. component of the reproduced EFM RF signal is eliminated to obtain a recording laser power value at which the amplitude center of the AC coupling reproduce signal is equal to substantially zero. Discrimination of the recording laser power value is carried out by dividing the detected power range and measuring the recording laser power values ever respective divisional points and thereafter by interpolating the recording laser power values between respective divisional points by a method such as a linear approximation, etc. to make adjustment to improve the accuracy.

However, the optimum recording laser power value obtained by the above-described calibration, varies in dependency upon a laser diode wavelength. Further, this wavelength varies in dependency upon a chip or ambient temperature of the laser diode. On the other hand, the wavelength of the laser diode also changes due to the passage of time (chemical change of coloring matter etc.) of the disk.

Consequently, the optimum recording laser power value varies depending upon the ambient temperature and the aging of the laser diode.

As a result, the optimum recording laser power value will significantly vary in dependency upon the ambient temperature and the wavelength of the laser diode. For this reason, even if the above mentioned calibration is performed, an optimum value deviation may certainly exist.

Further, in the case where the laser diode is continuously operated, there is the possibility that the temperature may rise up in great degrees. Accordingly, a true optimum recording laser power value at the time of calibration and that at the time of an actual operation may differ from each other in great degrees.

As a result, it could not be said that the recording operation is necessarily carried out at an optimum value, which is the first problem of the related art devices.

Meanwhile, every time the recording operation onto a disk is interrupted in such a R-CD player, the optimum recording laser power value is determined before resuming the recording operation. For this reason, if the calibration is carried out every interruption of recording in the R-CD player, a considerable calibration area on the disk is required. For example, there may be prepared, as such a calibration area, an area permitting about as much as 100 times of calibrations, which is the second problem of the related art devices.

SUMMARY OF THE INVENTION

It is therefore an object of the present invention to provide an apparatus for controlling an emission power of a laser diode, which can save or economize an area for calibration, and can obtain a more reliable optimum recording power value of the laser diode.

According to the present invention, the above mentioned object can be achieved by a first apparatus for controlling an emission power of a laser diode in an apparatus for recording and reproducing information of an optical disk, which has a power calibration area and to which a disk discrimination code is recorded. The first controlling apparatus of the present invention is provided with: a power detection device for detecting an optimum recording power of the laser diode with respect to the optical disk to be recorded by use of the information reproduced from the power calibration area; a temperature detection device for detecting a temperature of the laser diode; a memory device for storing the optimum recording power detected by the power detection device, the temperature detected by the temperature detection device and the reproduced disk discrimination code; and a control device, to which the disk discrimination code reproduced at the present time is inputted, for comparing the temperature at the present time detected by the temperature detection device and the temperature stored in the memory device corresponding to the inputted disk discrimination code, and instructing the power detection device to detect the optimum recording power if the difference between the compared temperatures exceeds a predetermined value before a recording operation of the recording and reproducing apparatus.

According to the diligent research by the inventor of the present invention, it is found that, in the calibration method of the optimum recording laser power value by reproducing the recorded test signals to eliminate, by an AC coupling capacitor for example, the d.c. component of the EFM·RF signal, the discrimination of the recording laser power value can be carried out by dividing the range of about 4~10 mW every 0.5~2 mW, for example, by measuring the recording laser power values every respective divisional points, and thereafter by interpolating the recording laser power values between respective divisional points, with the accuracy of about 0.1 mW.

However, in this situation, it is found that the optimum recording laser power value has a wavelength dependency varying with a coefficient of about 0.1 mW/nm. Further, this wavelength has a temperature dependency varying with a coefficient of about 0.33 nm/° C. As a result, the optimum recording laser power value will vary with a coefficient of about 0.033 mW/° C. For this reason, the optimum value deviation of about 1 mW may take place with respect to a temperature change of 30° C. in the performance guarantee range (5°~35° C.) of the laser diode. Further, in this situation, if the laser diode is continuously operated it is found that there is the possibility that temperature may rise up as high as about 60° C.

In view of this, it is firstly tried by the inventor of the present invention, to cancel or eliminate such an optimum value deviation, by employing a temperature detection device for detecting the chip temperature of the laser diode or the ambient temperature of the laser diode to output a temperature detection signal, and a temperature correction device for correcting the emission power of the laser diode on the basis of the temperature detection signal and the temperature characteristic of the laser diode. By employing these temperature detection device and the temperature correction device, the emission power becomes in correspondence with the optimum value. Thus, deviation in the optimum value resulting from the temperature dependency of the laser diode can be corrected. As a result, the recording laser power value can be always maintained at an optimum value in a certain situation.

However, by merely employing these temperature detection device and the temperature correction device in this manner, still a considerable calibration area (PCA; Power Calibration Area) on the R-CD is required, as in the case of the aforementioned related art device.

According to the knowledge of the inventor of the present invention, it is effective to prepare an area (PMA; Program Memory Area) for preserving or storing information relating to the disk in the middle of recording in the R-CD, in order to save and economize such a calibration area. In this PMA area, disk discrimination codes for discriminating individual disks can be recorded (such disk discrimination codes are prepared by random number of "Decade Six Digits"). When the optimum recording laser power value is once obtained by calibration in the recording operation of the R-CD, the disk discrimination code of that disk and thus obtained optimum recording laser power value, are stored into a memory within the R-CD player in such a manner that they are in correspondence with each other. Then, at the time of starting of recording, thus stored disk discrimination code is read out from the loaded disk, and it is judged whether or not the optimum recording laser power value corresponding to the discrimination code of the loaded disk is stored. And, if it is stored, the recording can be started by use of the read out optimum recording laser power value without conducting calibration again.

In this manner, even if the R-CD in the middle of recording is unloaded from the R-CD player, and is loaded again thereinto later on, the optimum recording laser power value can be provided without conducting the calibration again with an accuracy where the malfunction probability is about 1/1,000,000. Thus, the area for calibration can be saved and economized by employing such a PMA area.

Consequently, in the first controlling apparatus of the present invention, when the optimum recording power is detected by the power detection device, the recording power information as well as the temperature information at that time is stored into the memory device. When the recording operation onto the optical disk is interrupted and is resumed, the control device obtains the discrimination code read out from the optical disk subject to the recording operation. The control device also obtains the temperature detected by the temperature detection device at the present time, and the temperature information corresponding to the discrimination code stored in the memory device. Then, the comparison between these temperatures is performed. On the basis of the comparison result, a judgment as to whether or not the detecting operation by the power detection device should be carried out. Namely, the temperature at the time of detecting the optimum recording power value which has been previously carried out with respect to the optical disk subject to recording, and the present temperature, are compared with each other. As a result, if the temperature difference is not so large, the stored optimum recording power value is assumed to be practically unchanged and is used as it is. In contrast, if the temperature difference is above a predetermined value, an optimum recording power value is detected again by the optimum value detection device, since the previously detected value is not practically valid any more.

Thus, in case of carrying out a supplemental recording onto the same disk, if the temperature condition of the laser diode is the same as before, the optimum recording power value previously detected is judged to be used without conducting unnecessary calibration. For this reason, an area for calibration is saved or economized.

Further, in the case where there is a large difference in the temperature, which causes the problem by the wavelength change etc., the calibration is conducted again so that the optimum recording power value under the present condition is detected. For this reason, it is possible to carry out the control of the emission power of the laser diode by a more reliable optimum recording power value.

In this manner, an area for calibration can be saved and economized, and, at the same time, a more reliable optimum recording power value of the laser diode can be obtained according to the first controlling apparatus of the present invention.

According to the present invention, the aforementioned object can be also achieved by a second apparatus for controlling an emission power of a laser diode in an apparatus for recording and reproducing information of an optical disk, which has a power calibration area and to which a disk discrimination code is recorded. The second controlling apparatus of the present invention is provided with: a power detection device for detecting an optimum recording power of the laser diode with respect to the optical disk to be recorded by use of the information reproduced from the power calibration area; a clock device for generating time information; a memory device for storing the optimum recording power detected by the power detection device, the time information generated by the clock device and the reproduced disk discrimination code; and a control device, to which the disk discrimination code reproduced at the present time is inputted, for comparing the time information at the present time generated by the clock device and the time information stored in the memory device corresponding to the inputted disk discrimination code, and instructing the power detection device to detect the optimum recording power if the difference between the compared time information exceeds a predetermined value before a recording operation of the recording and reproducing apparatus.

In this second controlling apparatus, the judgement whether or not the optimum recording power detecting operation should be carried, is performed on the basis of the time information such as date information, instead of the temperature as in the case of the above mentioned first embodiment. Namely, the memory device stores the time information as well as the disk discrimination code information and the optimum recording power. The control device compares the time (date) of the previously performed detecting operation of the optimum recording power, and the present time (date). As a result, if the time (date) difference is not so large, the stored optimum recording power value is assumed to be practically unchanged and is used as it is. In contrast, if the time difference is above a predetermined value, an optimum recording power value is detected again by the optimum value detection device, since the previously detected value is not practically valid any more.

Thus, in case of carrying out a supplemental recording onto the same disk, if only short time has passed after the previously performed calibration, the optimum recording power value previously detected is judged to be used without conducting unnecessary calibration. For this reason, an area for calibration is saved or economized.

Further, in the case where there is a large difference in the time, which causes the problem by the influence of the aging etc., the calibration is conducted again so that the optimum recording power value under the present condition is detected. For this reason, it is possible to carry out the control of the emission power of the laser diode by a more reliable optimum recording power value.

In this manner, an area for calibration can be saved and economized, and, at the same time, a more reliable optimum recording power value of the laser diode can be obtained according to the second controlling apparatus of the present invention.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENT

A preferred embodiment of this invention will now be described with reference to the attached drawings.

Figure 1:
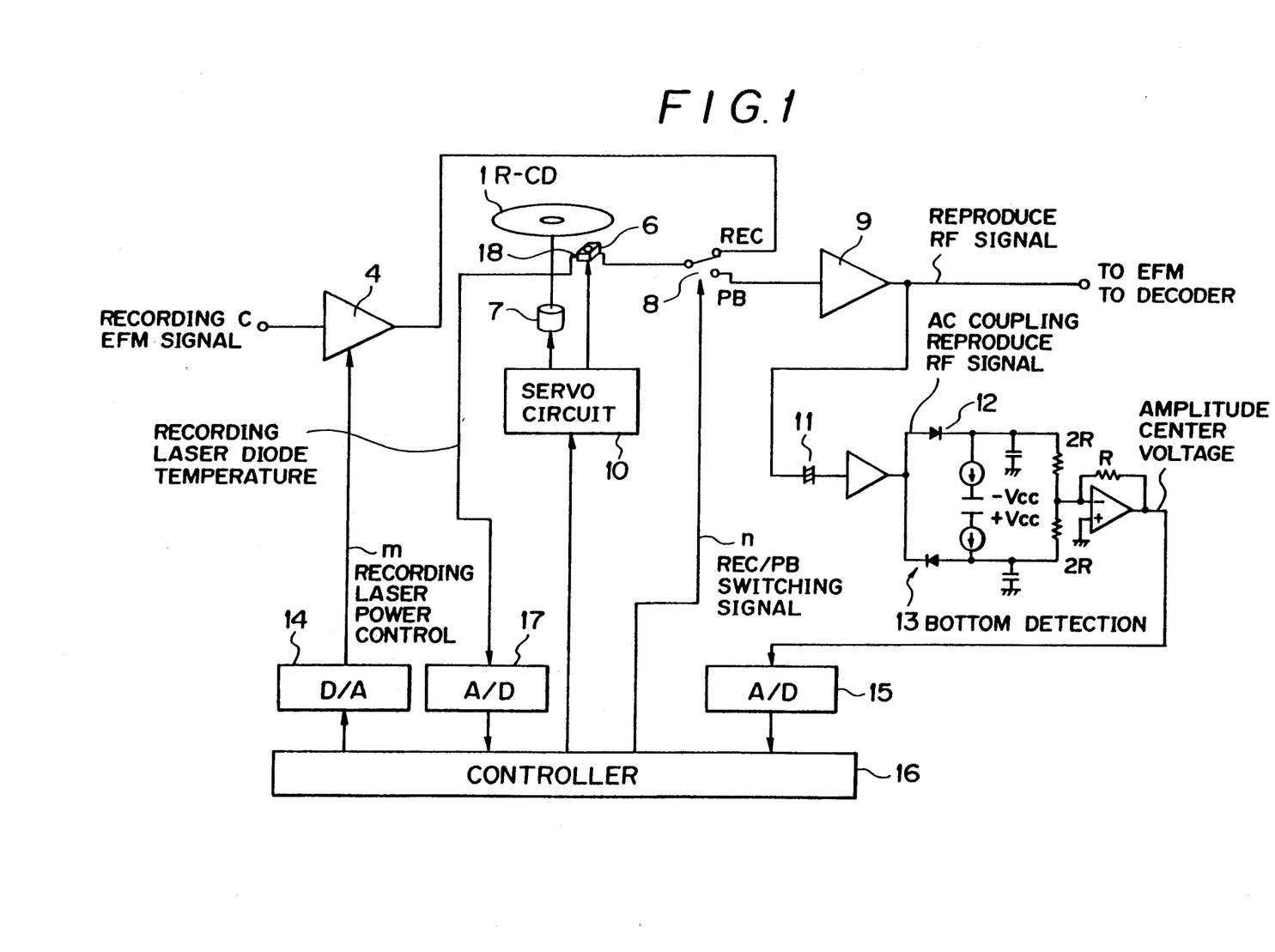
FIG. 1 is a block diagram showing the essential part of a recordable/reproducible R-CD player including an emission power control apparatus according to one embodiment of this invention.

FIG. 1 is a block diagram showing the essential part of a recordable/reproducible R-CD player including an emission power control apparatus for laser diode according to one embodiment of this invention.

In FIG. 1, the R-CD player is provided with a recording amplifier 4, a pick-up 6, a spindle motor 7, a recording/reproduction (playback) (REC/PB) changeover switch 8, a reproducing amplifier 9, a servo control circuit 10, an AC coupling capacitor 11, a peak detector 12, a bottom detector 13, a D/A converter 14, an A/D converter 15, a controller (servo mechanical control microcomputer) 16, an A/D converter 17 and a temperature sensor 18.

In the R-CD player shown in FIG. 1, when a R-CD 1 is loaded, it is determined whether or not it is an initial recording process for the loaded R-CD 1, by reading disk discrimination codes of the R-CD 1. As a result, in the case where it is found to be the initial recording process, a calibration process is performed by detecting an optimum recording power of a laser diode in the pick-up 6.

The calibration will now be described hereinbelow. First, the spindle motor 7 is driven, in accordance with control by the servo control circuit 10, to rotate the R-CD 1. At this time, the pick-up 6 is subjected to positioning by means of the servo control circuit 10 adapted for carrying a predetermined control in response to an instruction from the controller (servo mechanical control microcomputer) 16 so that it is placed on a track where a calibration area of the R-CD 1 is present. Then, a calibration signal is inputted through the recording amplifier 4 to drive the laser diode in the pick-up 6 to carry out recording into the calibration area. A recording laser power at this time is adjusted or changed stepwise by controlling the recording amplifier 4 by the controller 16 through the D/A converter 14. Thus, a predetermined recording is conducted.

When recording of the calibration signal is completed, reproduction of that calibration signal is then carried out After the pick-up 6 is subjected to positioning so that it is in correspondence with the leading position of the area where recording has been conducted, the recording/reproduction (playback) (REC/PB) changeover switch 8 is switched to the PB side to carry out readout of the calibration signal. After the read signal is amplified by the reproducing amplifier 9, its RF signal is outputted to a EFM decoder (not shown). On the other hand, the RF signal outputted from the reproducing amplifier 9 is delivered to the AC coupling capacitor 11, by which its d.c. component is cut or eliminated. The RF signal thus processed is subjected to detection of an amplitude center voltage through the peak detector 12 and the bottom detector 13. The amplitude center voltage thus detected is inputted to the controller 16 through the A/D converter 15, at which it is subjected to calculation of an optimum recording power value. In the controller 16, a recording laser power at the stage where the inputted amplitude center voltage crosses with zero volts is determined to be an optimum recording power value. Thus, the calibration is completed. Recording to be subsequently carried out is conducted by controlling the recording amplifier 4 by use of thus determined optimum recording power value.

In this embodiment shown in FIG. 1, the temperature sensor 18 and the A/D converter 17 are provided as temperature detection means. The temperature sensor 18 is provided at the pick-up 6 so that the chip temperature or the ambient temperature of the laser diode in the pick-up 6 is measured. The measured temperature information is inputted to the controller 16 through the A/D converter 17.

Figure 2:
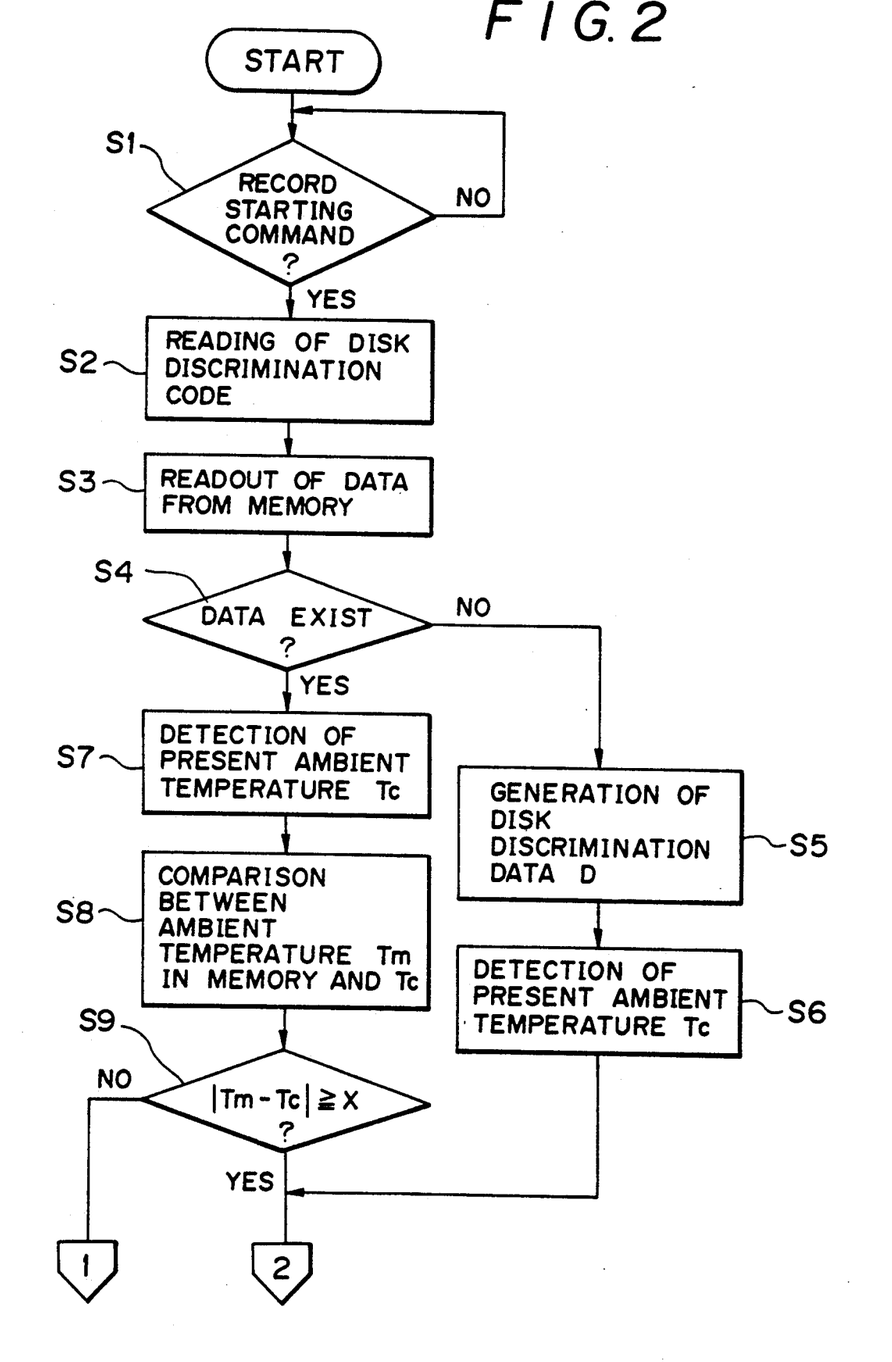
FIG. 2 shows a flow chart of the processing procedure of the embodiment of FIG. 1.
Figure 3:
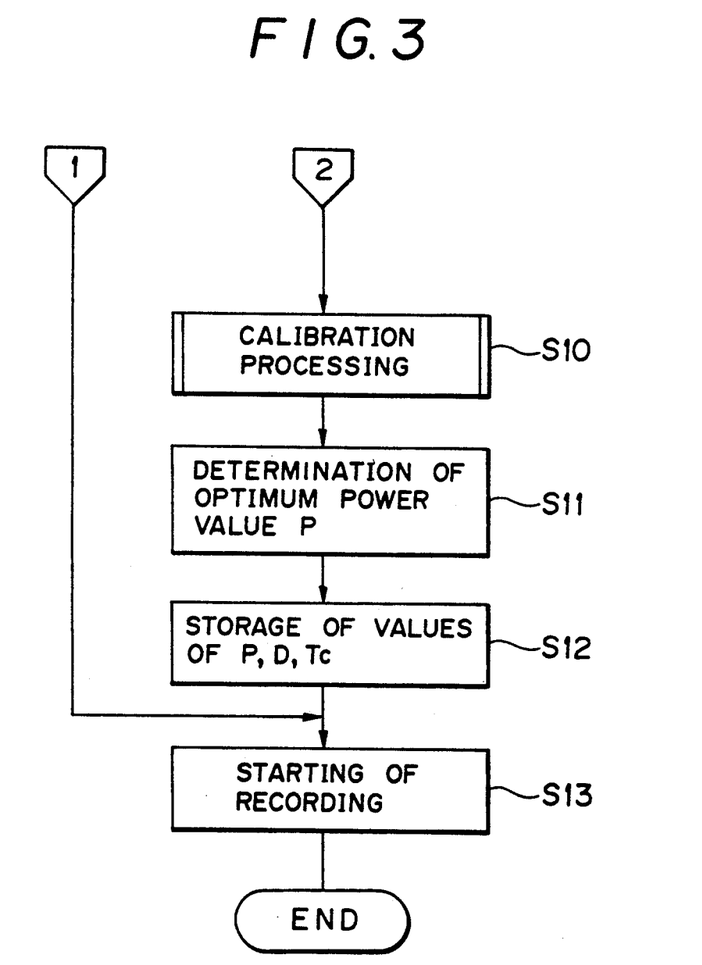
FIG. 3 shows a flow chart of the processing procedure of the embodiment of FIG. 1.
Figure 4:
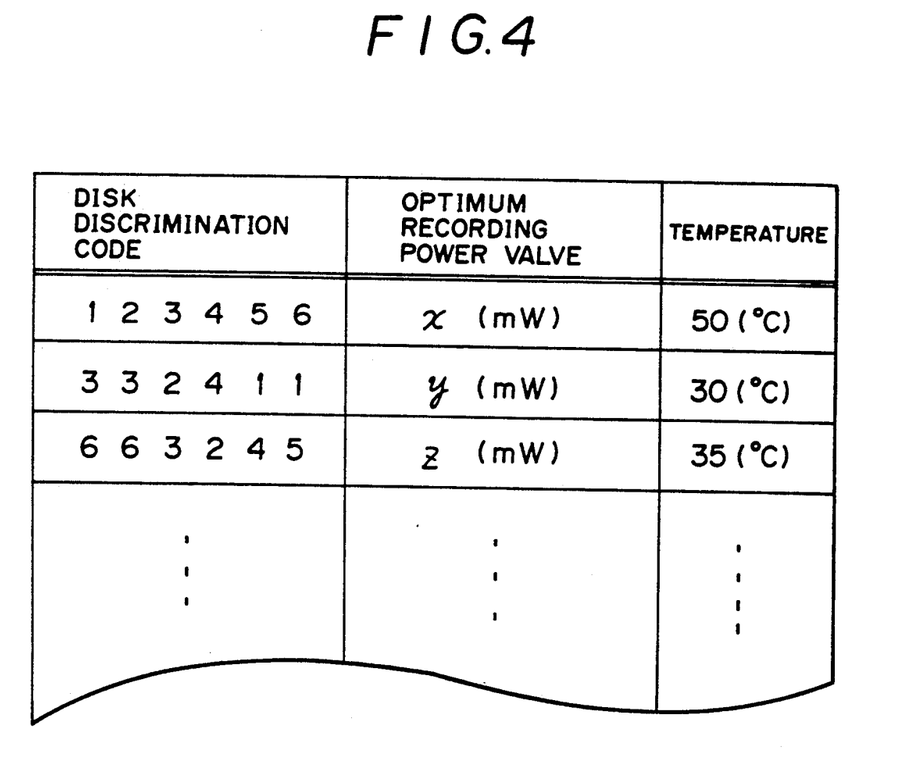
FIG. 4 is a view showing an example of recording power information stored in the internal memory of the embodiment of FIG. 1.

The judgment processing as to whether or not calibration should be carried out prior to carrying out recording onto the loaded R-CD 1 will now be described with referring to FIGS. 2 to 4. This judgment processing is carried out by the controller 16. The flow charts of the processing carried out by the controller 16 are shown in FIGS. 2 and 3. In the process of storing the recording power information, the recording power information including a disk discrimination code, an optimum recording power, and an ambient temperature of the laser diode, is stored into the internal memory of the controller 16, every time the calibration processing is carried out. An example of recording power information stored into the internal memory is shown in FIG. 4. The judgment processing will now be described in accordance with the flow chart showing the processing procedure of FIGS. 2 and 3.

When a record starting command is inputted from a key input unit (not shown), a discrimination code of the loaded disk is read (steps S1, S2). Subsequently, data of the internal memory is read out to determine whether or not the recording power data corresponding to the discrimination code thus read is stored i.e. exists (steps S3, S4). As a result, if no data is stored (NO), a disk discrimination code D is generated (step S5) to be recorded into a predetermined area of the disk, and then a present ambient temperature $T_c$ is detected from the temperature sensor 18 (step S6) to carry out a calibration processing (step S10 in FIG. 3).

In the case where it is determined at the step S4 that the recording power information corresponding to the discrimination code of the loaded disk is stored (YES), a present ambient temperature $T_c$ is detected from the temperature sensor 18, and corresponding temperature data $T_m$ stored in the internal memory is read out (step S7). Then, the comparison therebetween is performed (steps S8 and S9). If the temperature difference is less than a predetermined value X as the result of comparison (NO), an optimum recording power value of the recording power information stored in the internal memory is read out without carrying out calibration to perform the record starting processing on the basis of that optimum recording power value at the step S13 (FIG. 3).

In contrast, in the case where the temperature difference is not less than the predetermined value X (YES) at the step S9, the control of the aforementioned calibration processing is carried out to determine an optimum recording power value P to store, into the internal memory, the determined optimum recording power value P, the disk discrimination code D, and the ambient temperature $T_c$ in such a manner that they are in correspondence with each other (steps S10~S12). Subsequently the record starting control is carried out by use of the optimum recording power value thus obtained (step S13).

As stated above, in this embodiment, in the case of a supplemental recording onto the R-CD, the comparison between a present ambient temperature of the laser diode and a stored value is performed. As a result, when the temperature difference is less than the predetermined value, recording is carried out by use of the optimum recording power value previously obtained without conducting calibration. In contrast, when that the temperature difference is not less than the predetermined value, the calibration is carried out to obtain an optimum recording power value to carry out recording on the basis of that value.

Figure 5:
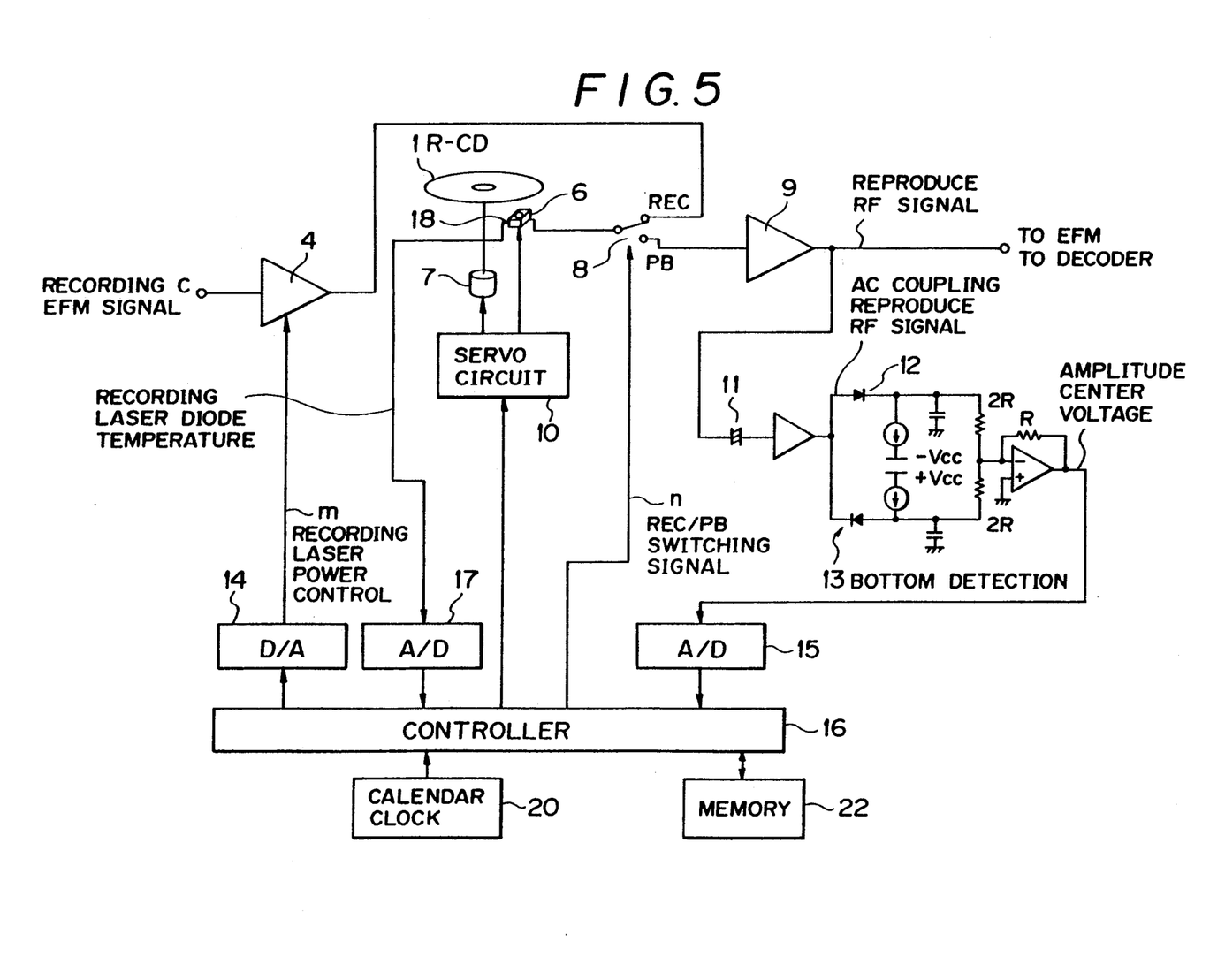
FIG. 5 is a block diagram showing the essential part of a recordable/reproducible R-CD player including an emission power control apparatus according to another embodiment of this invention.

A second embodiment of the present invention will be described hereinbelow with referring to FIG. 5. In FIG. 5, the same elements a those in the first embodiment carry the same reference numerals and the explanations thereof are omitted.

In FIG. 5, a R-CD player is provided with a calendar clock 20, coupled with the controller 16. The calendar clock 20 is adapted to supply the calendar signal to the controller 16 so as to add date information to the recording power information to be stored when the calibration is carried out. The comparison of date information is performed in the case where the temperature difference is less than a predetermined value. At this time, the recording operation is performed by use of the stored optimum recording power value without conducting calibration if the difference of the number of date is below a predetermined value. Alternatively, the calibration is performed if the difference of the number of dates is not less than the predetermined value, so as to obtain the optimum recording power value on the basis of thus calibrated value.

Thus, since it is possible to cope with changes in the optimum recording power value due to the passage of time or aging of the laser diode in the pick-up 6, the recording operation can be performed by use of a more reliable optimum recording power value. It is to be noted that time information may be included in date information when needed to carry out more fine comparison.

In the aforementioned first embodiment, the memory for storing the temperature information, the discrimination code information, etc., is provided within the controller 16. Instead, in the second embodiment, a memory device 22, such as a RAM (Random Access Memory) etc., is externally equipped with respect to the controller 16.

In the second embodiment, the calendar clock 20 is externally equipped with respect to the controller 16. Instead, the calendar clock can be provided within the controller 16.

Figure 6:
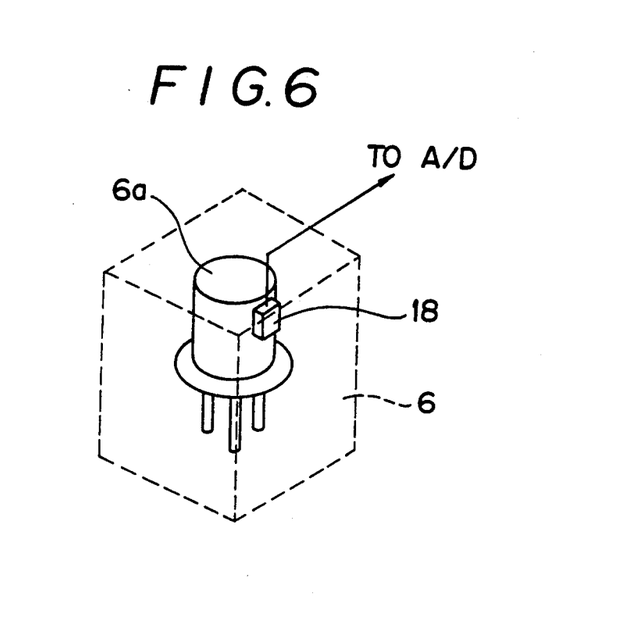
FIG. 6 is a schematic perspective view of a laser diode in a pick-up of the R-CD player of FIG. 1.
Figure 7:
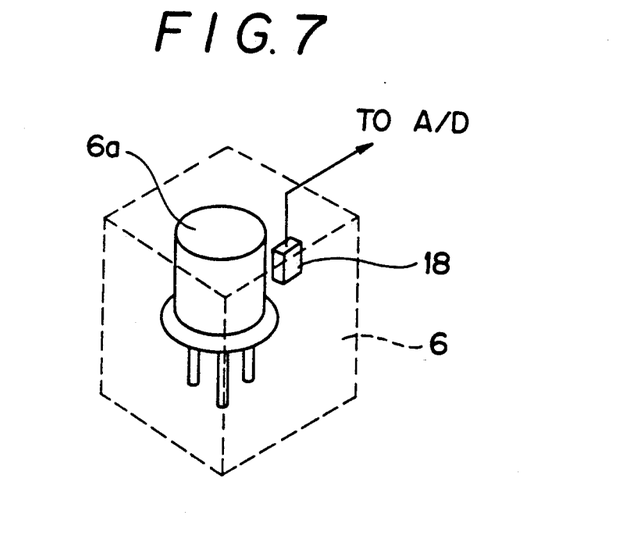
FIG. 7 is a schematic perspective view of a laser diode in a pick-up of the R-CD player of FIG. 1.

As shown in FIG. 6, the temperature sensor 18 can be attached to the laser diode 6a installed in the pick-up 6, in the above mentioned first and second embodiments, so as to detect the chip temperature of the laser diode 6a. Alternatively, as shown in FIG. 7, the temperature sensor 18 can be equipped in the pick-up 6, at the vicinity of the laser diode 6a, so as to detect the ambient temperature of the laser diode 6a.

As described above, in accordance with the emission power control apparatus for laser diode according to the embodiments, there are provided the advantages that an area for calibration can be saved or economized and that a more reliable optimum recording power value of the laser diode can be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A controlling apparatus for controlling an emission power of a laser diode in a an apparatus for recording and reproducing information onto and from an optical disk having a power calibration area and an ability to record a disk discrimination code, said controlling apparatus comprising:
   a power detection means for detecting an optimum recording power of the laser diode with respect to the optical disk to be recorded by use of the information reproduced from the power calibration area;
   a temperature detection means for detecting a temperature of the laser diode;
   a memory means for storing the optimum recording power detected by said power detection means, the temperature detected by said temperature detection means and the reproduced disk discrimination code; and
   a control means which reproduces the disk discrimination code at the time of recording, for comparing the temperature detected by said temperature detection means with the temperature stored in said memory means corresponding to the disk discrimination code, and for instructing said power detection means to detect the optimum recording power if the difference between the compared temperatures exceeds a predetermined value before a recording operation of said recording and reproducing apparatus.

2. A controlling apparatus according to claim 1, wherein said temperature detection means detects a chip temperature of the laser diode.

3. A controlling apparatus according to claim 1, further comprising a clock means for generating a first time information to said control means, and wherein
   said memory means further stores the first time information, together with the detected optimum recording power, the detected temperature and the reproduced disk discrimination code, and
   said control means compares a starting time information at the time of recording generated by said clock means with the first time information stored in said memory means corresponding to the disk discrimination code, and instructs said power detection means to detect the optimum recording power if the difference between the first time information and the starting time information exceeds a predetermined value.

4. A controlling apparatus according to claim 3, wherein said clock means generates a calendar information as a second time information.

5. A controlling apparatus for controlling an emission power of a laser diode in an apparatus for recording and reproducing information onto and from an optical disk having a power calibration area and an ability to record a disk discrimination code, said controlling apparatus comprising:
   a power detection means for detecting an optimum recording power of the laser diode with respect to the optical disk to be recorded by use of the information reproduced from the power calibration area;
   a clock means for generating time information;
   a memory means for storing the optimum recording power detected by said power detection means, the time information generated by said clock means and the reproduced disk discrimination code; and
   a control means which reproduces the disk discrimination code at the time of recording, for comparing the time information generated by said clock means with the time information stored in said memory means corresponding to the disk discrimination code, and for instructing said power detection means to detect the optimum recording power if the difference between the time information generated by said clock means and the time information stored in said memory means exceeds a predetermined value before a recording operation of said recording and reproducing apparatus.

6. A controlling apparatus according to claim 5, wherein said clock means generates calendar information as the time information.

7. A controlling apparatus according to claim 1, wherein said temperature detection means detects an ambient temperature of the laser diode.

* * * * *